Feb. 17, 1970 R. W. FREYTAG ET AL 3,496,553

SINTERED-FILM FERROELECTRIC MEMORY LINE

Filed Feb. 15, 1968

INVENTORS,
RICHARD W. FREYTAG &
JOSEPH W. GRATIAN.
BY Charles F. Gunderson AGENT.
Harry M. Saragovitz,
Edward J. Kelly &
Herbert Berl
ATTORNEYS.

United States Patent Office 3,496,553
Patented Feb. 17, 1970

3,496,553

SINTERED-FILM FERROELECTRIC MEMORY LINE

Richard W. Freytag, Fairport, and Joseph W. Gratian, Rochester, N.Y., assignors, by mesne assignments, to the United States of America as represented by the Secretary of the Army Filed Feb. 15, 1968, Ser. No. 705,698
Int. Cl. G11c *11/22;* H03h *9/30*
U.S. Cl. 340—173.2 9 Claims

ABSTRACT OF THE DISCLOSURE

This disclosure relates to ferroelectric memory lines and, particularly, to those in the form of a film of ferroelectric material such as barium titanate, shear-coupled to an acoustical transmission line. This disclosures describes a thin-film, ferroelectric memory line that has its ferroelectric material sintered onto a metallic foil or ribbon which is, in turn, bonded to a high efficiency, acoustical transmission line of fine-grain aluminum. The metallic foil serves as an electrode on one side and a second electrode is deposited on the opposing side of the ferroelectric material. An electromechanical transducer, with suitable control electrodes is mechanically bonded to one end of the acoustical transmission line.

The invention described herein may be manufactured, used, and licensed by or for the Government for governmental purposes without the payment to us of any royalty thereon.

BACKGROUND OF THE INVENTION

Ferroelectric memory lines are known and the concept of applying a relatively-short tensile or compressive pulse in coincidence with an electric field to enhance or inhibit 180° switching has been taught in the patent application Ser. No. 565,520 of which we are co-inventors. In the basic concept of ferroelectric memory lines the ferroelectric material, in the form of a bar, has one end coupled to a mechanical-pulse generator, and the ferroelectric material provides its own transmission line. Electrodes along the length of two opposing faces of the ferroelectric bar write or read out data as the mechanical pulse travels along the bar. However, the bar itself is not the best available acoustical transmission line.

An ideal acoustical transmission line, such as quartz or fine grain aluminum, may be used if the ferroelectric material and its electrodes, in film form, can be shear-coupled along the length of the acoustical transmission line. This is possible since the ferroelectric material has the same properties in either bar or film form. Such a device is described, for example, in the now abandoned patent application Ser. No. 341,297 entitled "Information Handling Apparatus" filed Jan. 30, 1964 in the name of J. W. Gratian. However, such improvements in ferroelectric memory lines bring on the problems of getting the most efficient and effective ferroelectric material, in film form, satisfactorily bonded to an ideal acoustical transmission line.

For example, bulk, sintered, ferroelectric materials may be ground and formed in thin films. However, the grinding process is time consuming and produces relatively thick films.

Thinner films may be formed by screening, or by vacuum depositing the green, potentially-ferroelectric material on a suitable substrate and then converting the films into active ferroelectric material by subsequent sintering.

However, the sintering process requires a considerable amount of heat and the temperatures required for the sintering of the potentially-ferroelectric material is higher than certain, desirable, low-attenuation, acoustical transmission lines, such as fine-grain aluminum, can tolerate.

It is therefore an object of this invention to provide an improved method for applying a sintered film of ferroelectric material to an acoustical transmission line with relatively-low heat tolerance.

BRIEF SUMMARY OF THE INVENTION

The objects of this invention are achieved by forming unsintered, potentially-ferroelectric material as a thin film on a metallic foil such as tungsten that can endure the temperatures required for sintering. The foil and the film are heated until the material of the film is sintered, whereupon it becomes actively ferroelectric. The metallic foil on one side of the ferroelectric film serves as one electrode, and a conducting film may be deposited on the other side of the ferroelectric film to serve as the other electrode. The foil of the memory line is bonded to the low-attenuation acoustical transmission line which has an electromechanical transducer bonded to one end. A series of these ferroelectric memory lines may, also, be coupled to a common electromechanical transducer. This invention will be better understood and further objects will become apparent from the following specification and the drawings.

DETAILED DESCRIPTION

Figure 1:
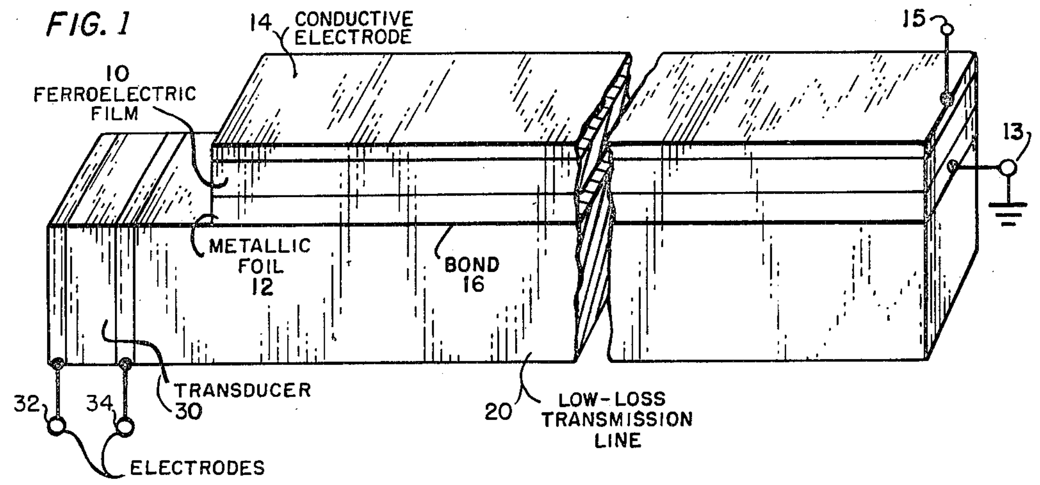
FIGURE 1 shows a strip of ferroelectric film and metallic foil bonded to a low-attenuation transmission line.

Refering now particularly to FIGURE 1, a sintered ferroelectric film 10 is shown bonded to a metallic foil 12 which serves as one of the electrodes for the ferroelectric film. A conductive electrode 14, in contact with the other side of the ferroelectric film, serves as the other electrode for the ferroelectric film. The metallic foil 12 and the conductive electrode 14 have terminals 13 and 15 respectively to connect the ferroelectric-film memory line into external circuitry. The metallic foil 12 is shear coupled to the low-loss transmission line 20 with bonding material 16. The end of the transmission line is mechanically coupled to an electromechanical transducer 30 which has electrodes 32 and 34.

In operation, an electrical pulse across the terminals 32 and 34 actuates the transducer 30 to generate a mechanical pulse which travels down the low-loss transmission line in a well-known manner. Another, delayed electrical pulse across the terminals 13 and 15 will write an address in the ferroelectric film material at the point where the electrical pulse coincides with the mechanical pulse along the ferroelectric film. For reading out, electrical pulse is also applied across the terminals 32 and 34, and a corresponding mechanical pulse again travels along the low-loss transmission line and an electrical signal is produced across the terminals 13 and 15 when the pulse passes each address point that has been written.

This type of ferroelectric memory line is well known, as has been noted elsewhere, and the actual functioning of the sintered, ferroelectric material as well as the functioning of the transducer and the acoustical transmission line is described in the patent applications cited earlier, as well as in other references.

The circuitry necessary to actuate the electromechanical transducer 30 and the transducer itself could be any of several types that need not be shown or discussed in detail here since they are well known in the art and they are not essential to an understanding of the invention. Similarly, the electrical circuitry necessary to write any desired sequence of data onto this memory line, or the circuitry necessary to read out the sequence of data for the duration of mechanical pulse are well known, and are not shown in detail here since they are not essential to an understanding of the invention.

Figure 2:
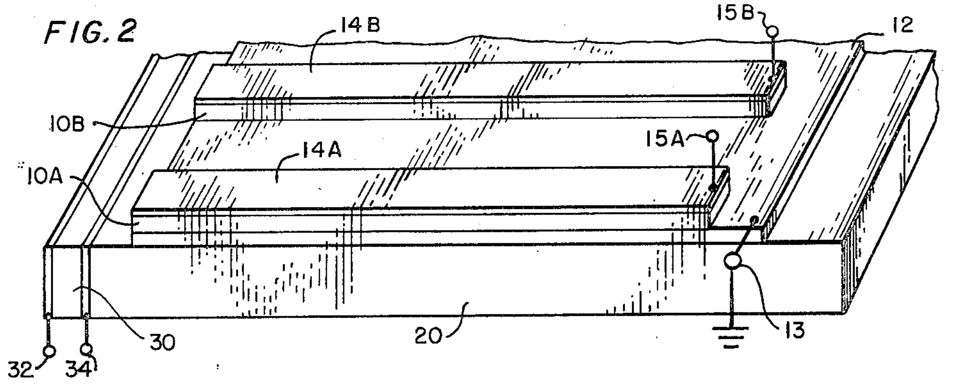
FIGURE 2 shows a series of such strips on a common, low-loss transmission line.

Referring now to FIGURE 2, where elements similar to those of FIGURE 1 have similar numbers, the low-loss transmission line 20 is shown with two ferroelectric-film memory strips 10A and 10B with corresponding, conductive electrodes 14A and 14B. However the ferroelectric films may be sintered onto a common metallic foil 12 with a common electrode 13. The transducer 30 has its own electrodes 32 and 34. Each of the separate conductive electrodes 14A and 14B has a corresponding terminal 15A and 15B respectively to provide additional memory lines using the same pulse. The foil 12 is bonded to a single, low-loss transmission line 20 which has a single transducer 30.

The operation of the device of FIGURE 2 is similar to that of FIGURE 1 with an electrical pulse across the terminals 32 and 34 of the transducer 30 producing a mechanical pulse which travels along the low-loss, acoustical transmission line 20. This mechanical pulse is applied simultaneously to both of the transmission lines 10A and 10B simultaneously. However, since each transmission line has its own electrode, separate data may be written into or read out of each of the transmission lines simultaneously.

Figure 3:
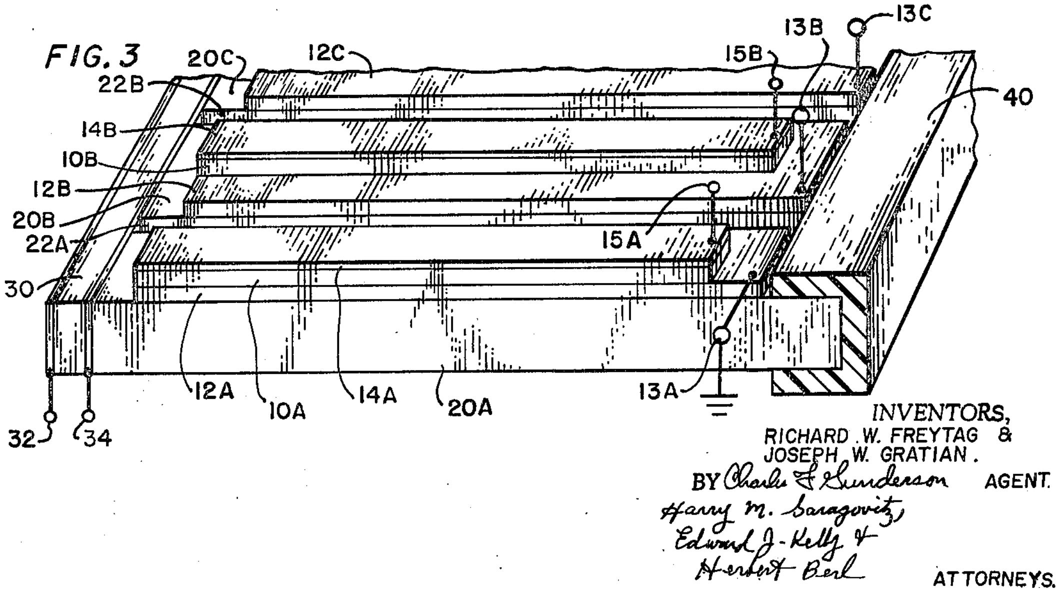
FIGURE 3 shows a series of strips as in FIGURE 2 with acoustical damping between strips.

While only two transmission lines are shown, for simplicity, the drawing of FIGURE 2, as well as that of FIGURE 3, indicates that more ferroelectric-film memory lines may be added to the same metallic foil. It will be apparent that with a strong transducer and an efficient transmission line and thin films, very many separate memory lines may share the same transmission line and transducer.

FIGURE 3 shows an additional species of FIGURE 2 where the metallic foil and the acoustical transmission line are slit along 22A and 22B to mechanically and acoustically decouple these separate, ferroelectric-film, memory lines to reduce mechanical interaction between them in a well-known manner. The slits 22A and B may extend part of the way, or all of the way to the common transducer 30 as shown here. This would be equivalent to several of the single memory lines, as in FIGURE 1, sharing the same transducer. The separate, low-loss transmission line segments 20A, B, and C may now have separate metallic foil strips 12A, B, and C with corresponding terminals 13A, B, and C as well as the separate conductive electrodes 14A and B with the corresponding terminals 15A and B.

Only two of the ferroelectric films and conductive electrode strips are actually shown as in FIGURE 2, although it is intended again, that more strips can be included.

The species of FIGURE 3 also includes a damping element 40 at the ends of the acoustic transmission lines 20A, B, and C opposite to that of the transducer 30, to terminate the mechanical pulse in a well-known manner. This would minimize pulse reflections to avoid an unwanted reversed readout by the pulse reflected back down the line.

In operation, the specie of FIGURE 3 is much the same as that of FIGURE 2, with a common pulse from the transducer 30 through the plurality of transmission lines 20 actuating the plurality of ferroelectric memory lines. The improvement of the specie of FIGURE 3 over that of FIGURE 2 is the acoustical isolation of the separate elements and the terminal damping.

A damping element, not shown, could also be attached to the opposite end of the transmission line, along with the transducer to further damp unwanted reflections of the mechanical pulse. These damping elements, or acoustical attenuators could be of a material such as neoprene rubber.

While the memory lines are shown on one side of the transmission line, it is obvious that similar memory lines could be bonded to the other side of the transmission line. Actually, if it were mechanically feasible they could be on all of the sides of a given transmission line.

Also, another transmission line with another set of memory lines could be bonded to the other side of the same transducer to utilize the same pulse traveling in the opposite direction.

The foils 12 can be bonded to the transmission line and the transmission line can be bonded to the electrode 34 in any well-known manner that produces good, mechanical, shear-coupling.

In certain cases the 3 foils 12 and the electrode 34 can be operated at ground potential to avoid problems of electrical insulation between each other as well as the common, transmission line.

This construction is applicable to other transmission-line materials, such as glass or quartz, but is particularly suited to and necessary in the case of fine-grain aluminum and other materials having a relatively low heat tolerance.

The ferroelectric film can be of materials such as barium titanate, or lead zirconate titanate. The electromechanical transducer can also be of lead zirconate titanate.

In the case of a metallic transmission line, and where the electrode 34 and one of the electrodes of the memory lnies can be grounded, the grounded transmission line can serve as one of the electrodes for both the transducer and the memory line. The conductive bonding of the transducer to the transmission line would eliminate the electrode 34, and the conductive bonding of the memory strip, upside down on its metallic foil substrate 12, could eliminate the conductive electrode 14.

What is claimed is:

1. A ferroelectric memory line comprising an elongated, mechanical, transmission line; a source of mechanical pulses; means for mechanically coupling said source of mechanical pulses to one end of said transmission line; an elongated, metallic-foil substrate; an elongated, ferroelectric film bonded and sintered to one side of said metallic-foil substrate, said metallic-foil substrate serving as a first electrode for said ferroelectric film; an elongated, conductive electrode in contact with said ferroelectric film opposing said metallic-foil substrate, said conductive electrode serving as a second electrode for said ferroelectric film; and means for bonding the other side of said elongated, metallic-foil substrate to said elongated, mechanical, transmission line.

2. A ferroelectric memory line as in claim 1 wherein said elongated, mechanical, transmission line is an acoustical transmission line.

3. A ferroelectric memory line as in claim 1 wherein said source of mechanical pulses is an electromechanical transducer having a pair of terminals and means for connecting said terminals to a source of electrical pulses.

4. A ferroelectric memory line as in claim 1 wherein said elongated, metallic-foil substrate is a strip of tungsten foil.

5. A ferroelectric memory line as in claim 1 having a first terminal connected to said first electrode; a second terminal connected to said second electrode and means for connecting a utilization circuit to said first and second terminals.

6. A ferroelectric memory line as in claim 1 having a mechanical damping material attached to the other end of said transmission line.

7. A plurality of ferroelectric memory lines comprising an elongated, mechanical, transmission line; a source of mechanical pulses; means for mechanically coupling said source of mechanical pulses to one end of said transmission line; a plurality of elongated, metallic-foil substrates; a continuous layer of ferroelectric material bonded and sintered to one side of each of said plurality of metallic-foil substrates, each of said metallic-foil substrates serving as a first electrode for its layer of ferroelectric material; a continuous, metallic film in contact with said layer of ferroelectric material and opposing said metallic-foil substrate on each of said layers of ferroelectric material, each of said metallic films serving as a second electrode for its layer of ferroelectric material; and means for bonding the other side of each of said plurality of metallic-foil substrates to said elongated, mechanical transmission line to form said plurality of memory lines.

8. A plurality of ferroelectric memory lines as in claim 7 wherein said elongated transmission line has a plurality of continuous slits parallel to and separating adjacent memory lines to provide mechanical isolation between said memory lines.

9. A plurality of ferroelectric memory lines comprising a plurality of elongated, mechanical, transmission lines; a single source of mechanical pulses; means for mechanically coupling said source of mechanical pulses to one end of each of said transmission lines; each of said elongated, mechanical, transmission lines having an elongated metallic-foil substrate; an elongated ferroelectric film bonded and sintered to one side of said metallic-foil substrate, which serves as a first electrode for said ferroelectric film; and a metallic film, which serves as a second electrode for said ferroelectric film, in contact with said ferroelectric film and opposing said metallic-film substrate; and means for bonding the other side of each of said elongated metallic-foil substrates to its corresponding one of said plurality of elongated, mechanical, transmission lines.

References Cited

UNITED STATES PATENTS

| | | | |
|---|---|---|---|
| 3,320,596 | 5/1967 | Smith | 340—73.2 |
| 3,434,119 | 3/1969 | Onyshkevych | 340—73.2 |

TERRELL W. FEARS, Primary Examiner

U.S. Cl. X.R.

333—30